United States Patent
Itria

[11] 4,053,027
[45] * Oct. 11, 1977

[54] USE FOR A SEISMIC ENERGY PULSE GENERATOR FOR GENERATING AND SHAPING A SEISMIC ENERGY PULSE

[75] Inventor: Oswald A. Itria, Bellaire, Tex.

[73] Assignee: Texaco Inc., New York, N.Y.

[*] Notice: The portion of the term of this patent subsequent to Sept. 30, 1992, has been disclaimed.

[21] Appl. No.: 555,462

[22] Filed: Mar. 5, 1975

Related U.S. Application Data

[63] Continuation-in-part of Ser. No. 411,598, Oct. 30, 1973, abandoned, which is a continuation-in-part of Ser. No. 239,530, March 30, 1972, abandoned.

[51] Int. Cl.² .......................... G01V 1/06; G01V 1/38
[52] U.S. Cl. ..................................... 181/118; 181/115; 181/142
[58] Field of Search ................. 181/115, 116, 118, 142

[56] References Cited

U.S. PATENT DOCUMENTS

| | | | |
|---|---|---|---|
| 2,770,312 | 11/1956 | Silverman | 181/.5 XC |
| 2,908,342 | 10/1959 | Itria | 181/.5 XC |
| 3,006,279 | 10/1961 | Lawrence | 181/.5 XC |
| 3,212,437 | 10/1965 | Saling | 181/116 |
| 3,331,050 | 7/1967 | Kilmer et al. | 340/7 R |
| 3,687,074 | 8/1972 | Andrews | 181/.5 XC |
| 3,908,789 | 9/1975 | Itria | 181/116 |

FOREIGN PATENT DOCUMENTS

826,932  1/1960  United Kingdom ................. 181/120

*Primary Examiner*—Maynard R. Wilbur
*Assistant Examiner*—T. M. Blum
*Attorney, Agent, or Firm*—Thomas H. Whaley; Carl G. Ries; Theron H. Nichols

[57] ABSTRACT

In seismic delineation of sedimentary section below the surface of a seismic energy propagation medium, a new use for an old article is disclosed. It includes a basic method for generating and shaping a seismic energy pulse comprising (1) generating a first energy pulse downwardly through the shortest distance to a point at the lower end of a vertical straight explosive material for forming a compressional forward portion of the seismic energy pulse, and (2) generating a second energy pulse later to form a rarefactional aft portion of the seismic energy pulse. By varying the length of the explosive material the lengths of the forward and aft portions are varied for controlling the shape of the seismic energy pulse, and by varying the position of the point of ignition of the linear explosive material, additional shaping of the seismic energy pulse results. This new use results in a method which produces a seismic energy pulse of the desired shape, a very thin elongated shape being preferable for attenuation of both the secondary bubble amplitude and time duration.

6 Claims, 6 Drawing Figures

USE FOR A SEISMIC ENERGY PULSE GENERATOR FOR GENERATING AND SHAPING A SEISMIC ENERGY PULSE

This is a Continuation-In-Part of my patent application Ser. No. 411,598, filed Oct. 30, 1973, now abandoned, which was a Continuation-In-Part of my patent application Ser. No. 239,530, filed Mar. 30, 1972, now abandoned.

BACKGROUND OF THE INVENTION

Broadly the present invention relates to a new use for an old device comprising a new method of seismic exploration and improved explosive marine seismic energy pulse generation for the introduction of seismic energy into water in a conventional shot hole filled with water, marshy areas, or particularly offshore from a floating vessel for supplying the explosive material and having a geophysical crew thereon for exploring earth layers and formations underlying land or bodies of water as oceans, seas, lakes, rivers, or the like. More particularly this invention pertains to a few methods for generating and shaping a seismic energy pulse resulting in attenuation and time delay of secondary pulses, and for generating and shaping the seismic energy pulse.

While methods are applicable for many purposes as will be set forth further below, they are illustratively disclosed and described as applied to underwater sound instrumentation such as oceanographic equipment and systems that are employed in seismic exploration of the world's crust under and adjacent to bodies of water.

Since water is such a good sound conductor, it is unnecessary to generate sound waves right on or in the ocean floor; they can be produced in the water near the surface. The pressure or energy waves travel down through the water to the ocean floor and are reflected as in the usual echo-sounding techniques. However, these waves also penetrate into the ocean floor and are reflected from the sub-strata. These seismic acoustical waves also propagate horizontally through one or more geological strata and may be recorded at a distance from the source, thus providing useful refraction data on the stratum or strata involved.

Although conventional explosives for marine seismic work can put large amounts of energy into the water and obtain great depth of penetration, they do have drawbacks; they are dangerous to handle and use, and in some areas such as congested harbors, they cannot be used at all. Also, each "shot" is very expensive and can run into many thousands of dollars per survey. Explosives tend generally to concentrate substantial amounts of their energy output into higher frequency components which may not be desirable for many purposes; whereas, the sound impulse generation method for the present invention can be adjusted over a low amplitude range and adjusted in frequency so as to provide the desired spectrum distribution of sound frequencies for the purposes at hand.

The present invention is illustratively described as embodied in a device capable of emitting a large amount of acoustical energy into water in the form of a clear, repeatable pulse, the frequency and amplitude of which may be readily averred. These powerful sound impulses are well adapted for use in seismic exploration systems and also can be used to advantage for other purposes.

Seismic surveys which are conducted over water covered areas use various methods for generating seismic energy as by the detonating of conventional powder or dynamite, or gas mixtures, electrical discharge of sparks to ionize a portion of the water surrounding the electrode, or suddenly releasing a container of high pressure air underwater for generating a large seismic or pressure wave signal. These seismic signals are reflected from subsurface geological formations and structures and are received by seismometers and recorded.

In most methods utilized, it is customary to either position one or more detectors on the ground surface or tow them through the water in the vicinity of the sound source to detect the signals that are reflected from the various subsurface formations and structures. The detected signals are recorded on suitable equipment contained on the towing vessels, either in the form of analog or digital signals. Also, at times the signals are recorded as variable area signals to provide a profile of the surveyed area. The latter recording is similar to those contained with conventional depth-sounding equipment.

All of the above seismic methods and devices have various disadvantages and thus none is completely suitable for use in all circumstances. The handling of an explosive material is, of course, dangerous as mentioned previously wherein the explosions themselves tend to kill much marine life, an example being disclosed in U.S. Pat. No. 2,877,859. Also, in the case of dynamite two separate vessels are required; one for handling the dynamite and the other for the recording equipment. This, of course, increases the cost of the survey.

Aside from the operational advantages over conventional dynamite surveys, the disclosed system affords better data acquisition through the effective attenuation of the signal's secondary oscillations and by the effective use of the ghost, reflected, or rarefactional seismic energy pulses.

The use of explosive gas mixture solves some of the problems that arise with dynamite, since explosive gas mixtures do not kill as much marine life, a further example being disclosed in U.S. Pat. No. 3,620,327. Normally, gas mixtures can be stored as separate, non-explosive gases on the same vessel that contains the recording equipment. Thus, the need for an additional vessel or the possibility of killing marine life, is reduced. While one disadvantage of gas type sound sources is the relatively short life of the flexible container or sleeve in which the explosive gas mixtures are detonated, conservation of the present environment is one of the principal problems.

In sound sources employing an electrical discharge, it has been customary to discharge a bank of capacitors charged to a high voltage through a single electrode or multiple parallel electrodes and a ground plate. When the capacitor bank is discharged into the water by the electrodes and ground plate the pressure bubble is produced at each electrode tip, for the ground plate serves as a return for the electrical energy. The pressure bubble produces the desired seismic impulse while the ground adds nothing to the magnitude of the outgoing acoustical wave. In fact, only 3-5 percent of the total electrical energy available in the capacitor bank is converted to useful acoustical energy in the water. Further many spark electrodes in parallel may be used simultaneously as disclosed in U.S. Pat. No. 3,613,823.

Well known methods to attenuate the pulsation of energy bubbles consists in using a metallic sphere which is provided with a plurality of holes regularly distributed on its wall and in which the explosion is carried out, this sphere being made of a material which can withstand the explosion, as disclosed in U.S. Pat. Nos. 2,877,859 and 3,525,416. While, however, it is difficult to build such spheres having a sufficient mechanical strength to withstand numerous repeated explosions, complete attenuation of bubble pulse amplitude is still lacking. Another known device comprises a container with a resilient opening and closing element which provides an intermittent connection of the interior of the container with the surrounding liquid medium, as disclosed in U.S. Pat. No. 3,444,953. None of the above systems completely attenuate the amplitude of bubble pulsation or oscillations.

While the use of "Primacord" is old when combined with a main charge of dynamite, as disclosed in U.S. Pat. No. 2,599,245, for creating a gas escape path for elimination of the bubble and its accompanying ghost pulse, but no means is disclosed for shaping the bubble pulse by using the reflected energy, as for generating an elongated seismic energy pulse at the lower end of the explosives, particularly by utilizing the ghost pulse.

A feature that is known about "Primacords" is that the distance between the primary pulse and the ghost pulse varies relative to the depth of the "Primacord", from Geophysics, October 1953, No. 4, pages 793-804.

Further uses of "Primacord" as a powerful explosive are disclosed in U.S. Pat. No. 2,609,885 and U.S. Pat. No. 2,775,878 wherein the explosive is coiled or packed in tight helical coils to concentrate the effect of the "Primacord" to produce a greater pressure rise than TNT by "focusing". No use for generating vertical energy pulses with straight lengths of "Primacord" are suggested herein, nor is the primary pulse strengthened by the reflected energy for pulse shaping disclosed.

While the use of dynamite is very restricted in offshore exploratory operations for preservation of the ecology, the restrictions on the utilization of "Primacord," or the like, is much less, if any. Only the dynamite caps used to detonate the "Primacord" must be handled with caution, comparatively.

Figure 2:
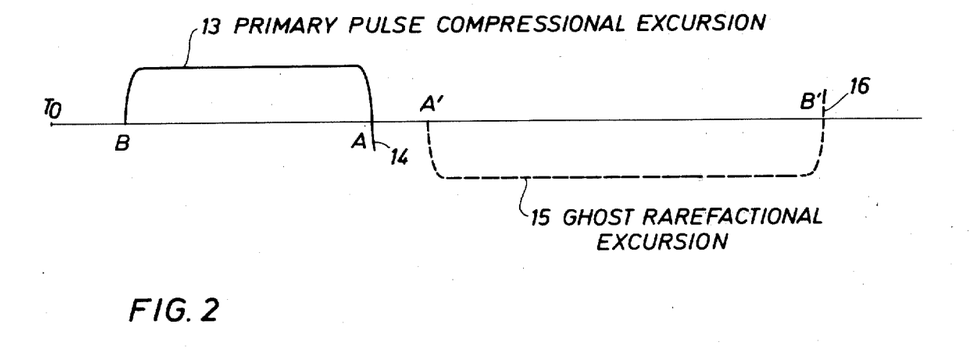
FIG. 2 is a pressure amplitude versus time set of typical curves for the fore and aft sections of a generated seismic energy pulse generated by the embodiment of FIG. 1.
Figure 4:
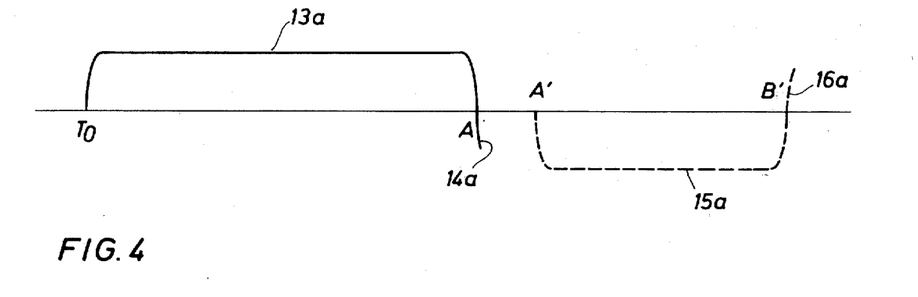
FIG. 4 is another pressure amplitude versus time set of curves of the fore and aft sections of a generated seismic energy pulse generated by the embodiment of FIG. 3.
Figure 6:
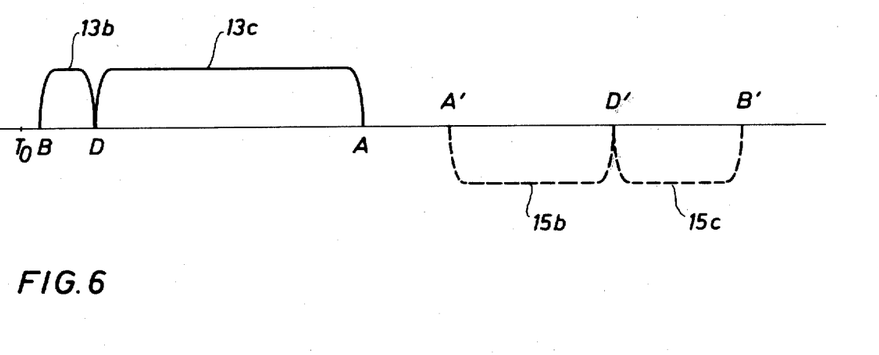
FIG. 6 is the pressure amplitude versus time set of curves of the fore and aft sections of a generated seismic pulse generated by the embodiment of FIG. 5.

The U.S. Pat. No. 3,212,437, however, discloses an elongated line charge, the primary objects of which are to form an explosive device having sound waves which spread in predetermined planes, i.e., "predominantly horizontal plane, in which there are inconsequential bottom and surface reflections of the water." On the contrary or alternative, the disclosed invention pertains to a new use for the above known device of utilizing the above noted "inconsequential bottom and surface reflections" for shaping a seismic energy pulse to a precise shape as illustrated in FIGS. 2, 4, and 6.

OBJECTS OF THE INVENTION

Accordingly, a primary object of this invention is to provide a new use for a known device comprising at least one method for generating and shaping a seismic energy pulse by using reflected energy.

Another object of this invention is to provide a new use for a known device comprising a method for attenuation of the amplitude secondary pulses resulting from a generated seismic primary energy pulse.

A further object of this invention is to provide a new use for a known device comprising a method for shaping the desired seismic signal by utilizing a harmless amount of explosive material for attenuation of secondary pulses.

Another object of this invention is to provide a new use for a known device comprising a method to attenuate the associated seismic bubble pulses and their detrimental effect to seismic exploration.

A still further object of this invention is to provide a new use for a known seismic energy pulse generator including a submerged vertical straight explosive material of a method of forming the pulse generator to a predetermined length for shaping the primary pulse so that its dominate frequency will be lowered for placing more of the energy into the useful seismic frequency range which results in greater penetration of the seismic signal within the sedimentary section.

Another object of this invention is to provide a new use for a known seismic energy pulse generator comprising a method which is easy to operate, uses devices of simple configuration, is economical to use, and is of greater efficiency for generating a primary pulse for greater penetration of the seismic signal within the sedimentary section.

Other objects and various advantages of the disclosed method as a new use for a known apparatus, generating and shaping a seismic energy pulse for attenuation of secondary pulses in offshore subsurface exploration, will be apparent from the following detailed description, together with accompanying drawings, submitted for purposes of illustration only and not intended to define the scope of the invention, reference being had for that purpose to the subjoined claims.

BRIEF DESCRIPTION OF THE DRAWINGS

The drawings diagrammatically illustrate by way of example, not by way of limitation, three forms or mechanisms utilized for carrying out the new use comprising new methods of the invention wherein like reference numerals have been employed to indicate similar parts in the several views in which.

DESCRIPTION OF THE INVENTION

The invention disclosed herein, the scope of which being defined in the appended claims, is not limited in its application to the details of construction and arrangement of parts shown and described for carrying out the disclosed method, since the invention is capable of other uses for other embodiments for carrying out other methods and of being practiced or carried out in various other ways. Also, it is to be understood that the phraseology or terminology employed herein is for the purpose of description and not of limitation. Further, many modifications and variations of the invention as hereinbefore set forth will occur to those skilled in the art. Therefore, all such modifications and variations of methods which are within the spirit and scope of the invention herein are included and only such limitations should be imposed as are indicated in the appended claims.

DESCRIPTION OF THE METHODS COMPRISING THE NEW USE FOR A KNOWN DEVICE

This invention comprises, in seismic delineation of sedimentary section below the surface of a seismic energy propagation medium, a few methods for attenuating the amplitude and for changing the time duration of the bubble or secondary pulses resulting from a seismic energy pulse. This is accomplished by generating or shaping a seismic energy pulse to a thin elongated shape to provide a seismic pulse of maximum energy for arriving at the ocean floor for penetration thereof.

One method for generating and shaping a seismic energy pulse below the surface of a seismic energy propagation medium comprises, a. generating a first energy pulse downwardly through the immediate surrounding energy propagation medium to form a compressional forward portion of the seismic energy pulse at a submerged point, and b. generating a second energy pulse upwardly and then downwardly arriving later at the submerged point to form a rarefactional aft portion of the seismic energy pulse.

More methods of shaping the seismic energy pulse comprise the above combination of two steps, but with various modified first steps as, a. propogating an energy pulse downwardly in the immediate surrounding energy propagation medium by initiating detonation at the upper end of the vertical straight explosive material, by initiating detonation at the lower end of the vertical straight explosive material, or initiating detonation at any desired or predetermined position intermediate the ends of the explosive material for forming the compressional forward portion of the seismic energy pulse.

Another method comprises the combination of a modified first step as, a. detonating a vertical straight explosive material for generating a first energy pulse downwardly through the shortest distance to a point at the lower end of the explosive material for forming a compressional forward portion of the seismic energy pulse of a predetermined shape, and by the addition of a third step to the former two steps including, b. varying the length of the vertical straight explosive material for varying therewith both the compressional forward portion length and the rarefactional aft portion length for further shaping of the seismic energy pulse.

DESCRIPTION OF THE FIRST MODIFICATION OF THE KNOWN SEISMIC ENERGY PULSE GENERATOR FOR PROVIDING ONE METHOD

Figure 1:
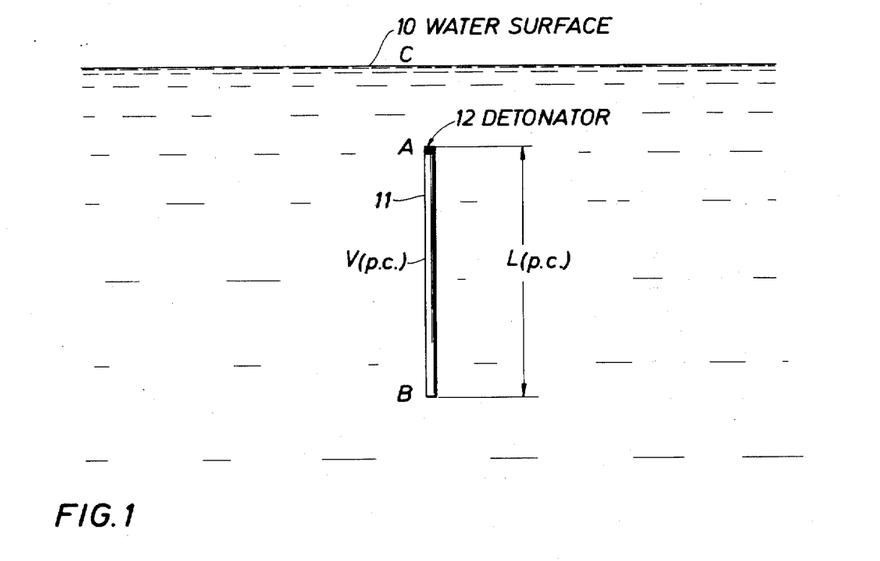
FIG. 1 is a schematic sectional view of a body of water with one embodiment of a seismic energy pulse generator illustrating a new use made of the generator for attenuating secondary pulses submerged therein.

FIG. 1 illustrates schematically a body of water in cross section having a surface 10 with one embodiment of a known mechanism or seismic energy pulse generator 11 having a new use and which is supported submerged therein for for carrying out at least one of the methods of generating a seismic pulse of maximum energy for penetrating the ocean floor.

While the body of water may be merely water in a shot hole or bore hole for firing the seismic energy pulse generator therein at substantial depths as between 50 and 250 feet usually in surveying the land therearound, the water is illustrated as a larger body of water as a river, swamp, lake, sea ocean, etc., where a seismic survey is desired of the bottom land or ocean floor below.

The seismic energy pulse generator 11 comprises a vertical straight explosive material, such as but not limited to "Primacord," suspended at a predetermined depth under water by a float 17 or the like. A detonator comprising a conventional dynamite cap 12 is mounted on the upper end of the "Primacord" as illustrated in the embodiment of FIG. 1. The "Primacord" with points A and B being located at the extreme upper end lower ends, respectively, thereof having a predetermined length A B or L(pc) and having a longitudinal axis 18, is submerged below the surface at a predetermined depth A C with C being a point on the water surface directly above the vertical "Primacord" 11, the longitudinal axis CAB of the "Primacord" being vertical, and the "Primacord" is positioned in a seismic energy propagation medium, usually water, which has a velocity of sound propagation of substantially 5,000 feet per second for simplicity of calculation in the following examples. An inherent feature of "Primacord" is that it is a vertical, straight, integral, homogeneous, explosive material having a constant uniform velocity of detonation (2,200 fps) for the full length thereof substantially greater than the velocity of propagation in the intermediate surrounding seismic energy propagation medium, as water (5,000 fps).

An expanding bubble of gases is formed by an underwater detonation, which bubble is free to float in the water as it rises to the surface and is free to oscillate or pulsate, that is to first expand until the hydrostatic pressure externally of the bubble in the water finally overcomes the momentum of the outwardly flowing water and the bubble begins to contract until the pressure in the bubble becomes so great that it overcomes the hydrostatic pressure and momentum of the water and expands back out again. This expanding and contraction of the free bubble in the water causes the subsequent signal pulsation or oscillation and the detrimental pulses of sound therefrom which are most annoying and detrimental to the receipt of intelligible data from seismic recorders.

It has been discovered that if a spherically shaped bubble is flattened or elongated so that the diameter or length of the major axis of the bubble is many times greater than the dimension of the bubble on the minor axis, the bubble will collapse with reduced force or impact and, as a result, the amplitude of the generated secondary bubble pulses or oscillation will be appreciably reduced. It is believed that this is because the bubble amplitudes are essentially in direct relationship to the smaller dimension of the bubble since the hydrostatic pressure on all surfaces of the bubble is, for all practical purposes, the same. Likewise, it is believed that as period is shortened, the secondary pulses are substantially attenuated.

For generating a seismic energy pulse for traveling straight down through the water to the ground or ocean floor below to delineate the sedimentary section below, the strongest downwardly traveling seismic energy pulse is formed at the bottom of the vertical straight explosive material as indicated by reference point B on the "Primacord" 11, FIG. 1.

This seismic energy pulse, illustrated on the pressure amplitude versus time curve of FIG. 2, comprises a forward or primary portion and an aft or ghost portion. The primary pulse is formed by a compressional excursion 13 having a time period of B A, and its rarefactional excursion 14 generated by the long piece of detonating "Primacord." The rarefactional excursion 14 attenuates so rapidly, it is practically insignificant and accordingly not shown. As detonation is initiated at the upper end, point A, of the "Primacord," FIG. 1, by the detonator 12 marking the time break T, the detonation proceeds downwardly for the full length of the vertical straight linear explosive material at the detonation velocity of substantially 22,000 feet per second. Of the energy transmitted to the immediate surrounding water from points A to B, from the detonating "Primacord," the portion thereof which travels straight down through the "Primacord" at substantially 22,000 feet per second forms the forward portion of the seismic energy pulse at point B. The portion of the energy radiating or traveling straight up from the vertical explosive material through the water to the surface and reflecting straight back down through the longer path, arrives later at point B to generate the ghost or rarefactional excursion 15 and its compressional excursion 16 which forms the aft portion of the seismic energy pulse illustrated on FIG. 2. Likewise, the compressional excursion 16 attenuates so rapidly, it is practically insignificant and accordingly not shown. For the sake of simplicity and clarity of disclosure, only the first excursions 14 and 16 of each pulse are illustrated.

The points A and B illustrate the points in time on the pressure amplitude versus time curves of FIG. 2 when the sound from the respective points A, B, FIG. 1, on the vertical straight explosive material 11 arrives through the water at the bottom of the explosive material relative to the instant $T_o$, FIG. 2, of detonation of the detonator. Points A' and B' on FIG. 2 illustrate the points in time when the point from the respective points A, B, FIG. 1, travel up to the surface and reflect back down to arrive at bottom point B relative to the instant $T_o$, FIG. 2.

A NEW USE FOR A TYPICAL EXAMPLE OF FIRST EMBODIMENT

Portions of this seismic energy pulse may be calculated as follows:

The pulse time lag is the period of time from the instant $T_o$, FIG. 2, of detonation of the cap 12, FIG. 1, until the instant B, FIG. 2, that the first sound of the first part or bottom of the detonating "Primacord" arrives at the bottom of the explosive material, point B, to commence the downward seismic energy pulse towards the ocean floor.

Where A B or Lpc is the length of the "Primacord," Vpc is the detonation velocity through the "Primacord," which is substantially 22,000 feet per second, and A B is 220 feet, for example, $$\text{Pulse Time Lag} = \frac{Lpc}{Vpc} = \frac{AB}{Vpc} = \frac{220}{22,000} = .010 \text{ seconds}$$

Where Vw = 5,000 feet per second, substantially the velocity of sound through water, Primary Pulse or Compessional Excursion Duration = B A $$(\text{FIG. 2}) = \frac{Lpc}{Vw} - \frac{Lpc}{Vpc} = \frac{AB}{Vw} - \frac{AB}{Vpc} =$$

-continued
$$\frac{220}{5,000} - \frac{220}{22,000} = .034 \text{ sec.}$$
$$.044 - .010 = .034 \text{ sec.}$$

Where the "Primacord" is submerged to a depth of 20 feet below the surface, A C, for example, is the distance from the top point A of the "Primacord" to the point C directly above on the water surface.

An equation to determine the onset time of A' of the ghost pulse after time break $T_o$ is:

$$T_{A'} = \frac{2AC + AB}{Vw} = \frac{40 + 220}{5,000} = .052 \text{ seconds}$$

The time lag or duration A–A' between the end of the primary pulse or compressional excursion and the beginning of the ghost pulse or rarefactional excursion = 2 A C/Vw 2 × 20/5,000 = 0.008 seconds.

Also, the time of arrival of B' after time break $T_0$ is:
$T_{B'} = (AB/Bpc) + (B A + A C + C A + A B)/Vw$
$= (A B/Vpc) + (2 A B + 2 A C)/Vw = 0.010 + 0.096 = 0.106$ seconds Therefore, the ghost pulse = $T_{B'} - T_{A'}$ = 0.106 − 0.052 = 0.054 seconds.

Another method of calculating the time duration of the ghost pulse or rarefactional excursion is $$A'B' = T_{B'} - T_{A'} = T_{\text{ghost}} = \left(\frac{AB}{Vpc} + \right.$$

$$\left.\frac{BA + AC;30CA + AB}{Vw}\right) - \left(\frac{AC + CA + AB}{Vw}\right) =$$

$$\frac{ABAB}{VpcVw} = \frac{220}{22,000} + \frac{220}{5,000} = .054$$

seconds duration.

Thus, the compressional excursion 13 and a part of its rarefactional excursion 14 form the forward portion of the seismic energy pulse and the ghost or rarefractional excursion 15 and its compressional excursion 16 form the aft portion of the seismic energy pulse.

In addition, it may be seen how the shape of the resulting or generated seismic energy pulse may be varied by varying the individual lengths of the forward and aft portions thereof.

By varying the length of the vertical straight linear explosive material 11, the shape of the resulting seismic energy pulse is varied, the longer expolsive material provides lengthening of the seismic energy pulse.

Varying of the depth A C of the explosive material 11 varies the time delay between the onsets of the compressional forward portion and the rarefactional aft potion for providing further shaping of the seismic energy pulse, the deeper the depth, the greater the time duration of the composited primary-ghost pulse or seismic energy pulse.

In actual operation, as the "Primacord" burns progressively from the detonator 12 to the far end, nothing is left of the "Primacord" but a minute bit of ash, if any, which mixes or dissipates in the water, leaving no second medium for more sound waves to travel in that would disturb to any great extent the original compressional and rarefactional portions of the seismic energy pulse formed at the bottom of the "Primacord."

Likewise, by varying the position of the detonator 12 or portion of ignition of the linear explosive material 11 from one end to the other end, additional shaping of the seismic energy pulse results. As is seen from the formulas above, that would vary the position and the length of the ghost pulse relative to the primary pulse, the lower the detonator is placed on the vertical straight linear explosive material, the shorter is the ghost pulse relative to the primary pulse.

A NEW USE FOR A SECOND EMBODIMENT

Figure 3:
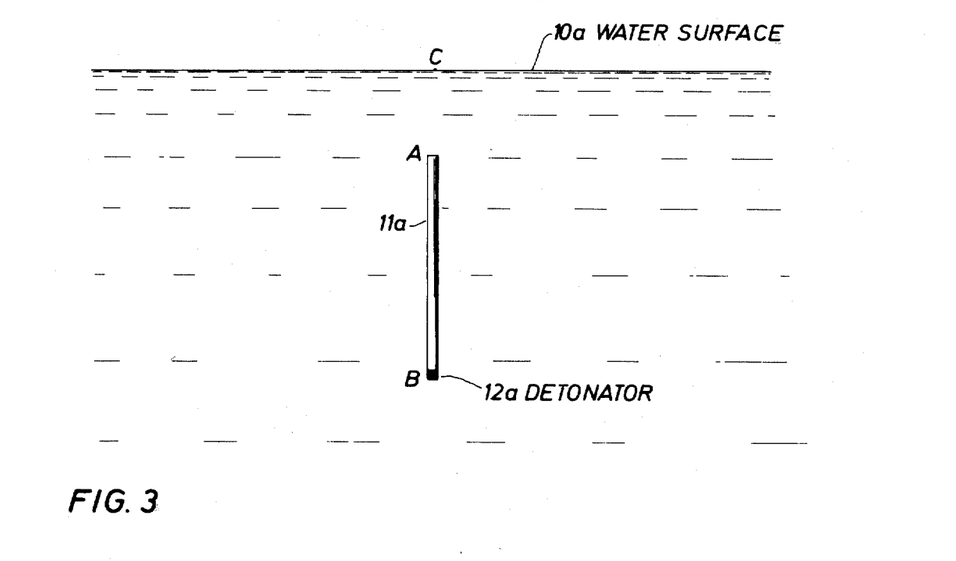
FIG. 3 is a modification of the embodiment of FIG. 1.

FIGS. 3 and 4 illustrate schematically a second known seismic energy pulse generator 11a having a new use and which is submerged at or below the water surface 10 for carrying out at least one of the above disclosed methods for generating and shaping a seismic energy pulse at the bottom of the "Primacord" 11a at point B.

The points $T_o$ and A illustrate the points in time on the pressure amplitude versus time curves of FIG. 4 when the sound from the respective points B, A, FIG. 3, on the vertical straight explosive material 11a arrives through the water at the bottom of the explosive material relative to the instant $T_o$, FIG. 4, of detonation of the detonator. Points $T_0$ and B are on the same point. Points A' and B', FIG. 4, illustrate the points in time when the sound from the respective points A, B, FIG. 3, travel up through the water to the surface and reflect back down to arrive at bottom point B and point B' relative to the instant $T_0$, FIG. 4.

This generator 11a comprises a vertical straight explosive material, such as but not limited to "Primacord" of a predetermined length A B suspended below the surface of the water at a predetermined depth A C on its vertical longitudinal axis C A B, with a detonator 12a, as a conventional dynamite cap secured to the lower end of the explosive material. Here likewise, a seismic energy pulse is formed at the bottom of the "Primacord" for traveling straight down through the water to the ground below to delineate the sedimentary section below.

In operation, upon firing of the detonator 12a, FIG. 3, the lower end of the "Primacord" is ignited to instantly start the forming of the forward portion or primary pulse compressional excursion 13a, FIG. 4, of the seismic energy pulse at time break $T_o$. As the "Primacord" burns upwardly at the rate of substantially 22,000 feet per second, the sound generated in the immediate surrounding water travels in all directions at 5,000 feet per second, that portion traveling straight down forms the primary pulse compressional excursion 13a. That portion of the sound of the burning or exploding "Primacord" that travels straight up, reflects off the surface at point C and returns straight down to point B of the generator 11a after traveling the longer route to form later the ghost pulse or rarefactional excursion 15a and its compressional excursion 16a at the end of the primary pulse compressional excursion 13a and a portion of its rarefactional excursion 14a to accordingly form the complete long time duration composite primary-rarefactional seismic energy pulse. Both excursions 14a and 16a attenuate so rapidly that they are practically insignificant and accordingly not shown. For the sake of simplicity and clarity of disclosure, only the first rarefactional excursion 14a and first compressional excursion 16a of each pulse are illustrated.

A NEW USE FOR A TYPICAL EXAMPLE OF SECOND EMBODIMENT

The shape of the seismic energy pulse of FIG. 4 may be calculated as follows:
Where:
A B = "Primacord" length — 220 feet, for example.
VpC = 22,000 feet per second — detonation velocity.
Vw = 5,000 feet per second = velocity of sound in water.
A C = 20 feet depth below point C on surface. Duration of Primary Pulse Compressional Excursion = (B A/Vpc) + (A B/Vw) = (220/22,000) + (220/5,000) = 0.054 seconds.

The time separation between the zero amplitude crossing of the positive excursion of the primary pulse compressional excursion and the onset of the ghost or rarefactional excursion is $T_S$ = A-A' = 2 A C/Vw = 40/5,000 = 0.008 seconds.

Time duration of ghost pulse or rarefactional excursion = $T_{A'B'}$ = (A B/Vw) — (A B/Vpc) = 220/5,000) — (220/22,000) = 0.034 seconds.

Thus it may be seen that the primary pulse compressional excursion 13a or forward portion of the resultant seismic energy pulse is elongated to its maximum length for the disclosed example and, for that particular depth A C, the rarefactional excursion 15a is shaped to its minimum length to provide the other extreme shape from the above first embodiment for a particular depth A C and length A B of explosive material.

Similar to the first embodiment, the shape of this second embodiment may be varied further by varying the length A B of the "Primacord," and the depth A C of the "Primecord," and the position of the detonator 12a on the "Primacord."

A NEW USE FOR A THIRD EMBODIMENT

Figure 5:
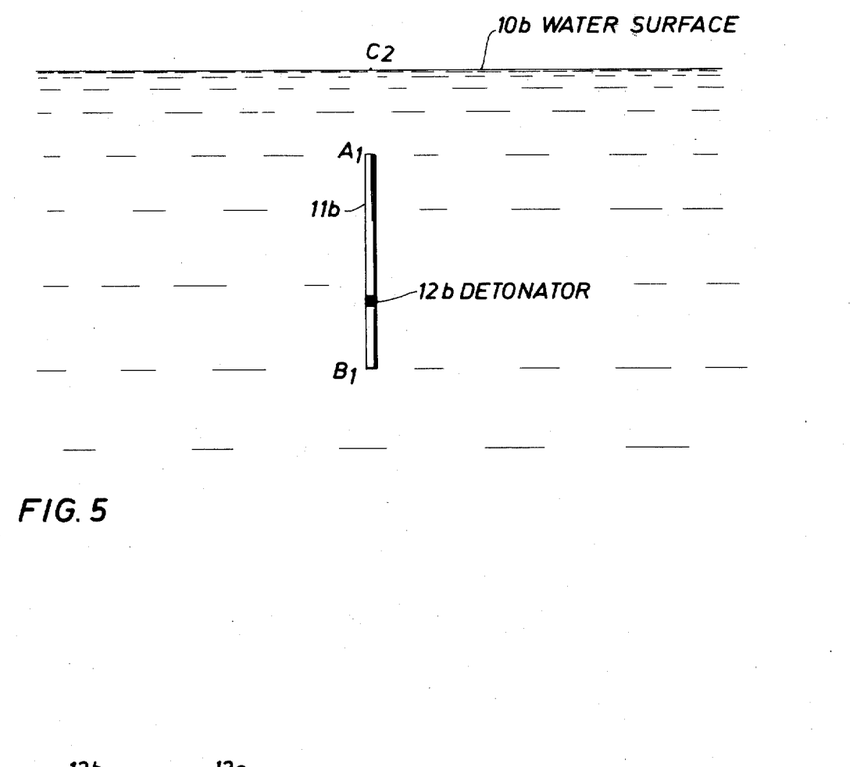
FIG. 5 is another modification of the embodiment of FIG. 1.

A third seismic energy pulse generator 11b having a new use and which is illustrated schematically in FIG. 5 with its generated and shaped seismic energy pulse shown in FIG. 6, for carrying out one of the above disclosed methods. This generator 11b comprises a vertical straight linear explosive material, such as but not limited to "Primacord" of a predetermined length A B suspended below the surface of 10b, FIG. 5, of the seismic energy propagation medium at a predetermined depth A C, similar to the above two embodiments, but with a detonator 12b, as a conventional dynamite cap positioned at any predetermined point D, FIG. 6, between the upper and lower ends, A and B, respectively, of the "Primacord." The longitudinal axis C A B of the "Primacord" is vertical. This last feature provides the greatest variation in shape of this third embodiment over each of the other two for a particular length A B and depth A C of the "Primacord."

The points A, D, and B illustrate the points in time on the pressure amplitude versus time curves of FIG. 6 when the sound from the respective points A, 12b, and B on the vertical straight explosive material 11b, FIG. 5, arrive through the water at the bottom of the explosive material relative to the instant $T_o$, FIG. 6, of detonation of the detonator. Points A', D', and B', FIG. 6, illustrate the points in time when the sound from the respective points A, 12b, and B, travel up through the water to the surface and reflect back down to arrive at bottom point B relative to the instant $T_o$, FIG. 6.

A NEW USE FOR A TYPICAL EXAMPLE OF THIRD EMBODIMENT

The seismic energy pulse shape of the above described third embodiment 11b having a new use and which is formed by adding two primary pulses 13b and 13c and two ghost pulses 15b and 15c generated by this embodiment whereby the resultant pulse is the algebraic summation of these four pulses. Further the shape may be varied as seen from the following calculations of an example:

Where:

A B = "Primacord" length = 220 feet, for example.
Vpc = 22,000 feet per second = detonation velocity
Vw = 5,000 feet per second = velocity of sound in water.
A C = 20 feet depth below point C on the surface.
D = Detonator, identified as 12b on FIG. 5.
D A = 150'
D B = 70' Pulses from generator portion D B:

PRIMARY PULSE COMPRESSIONAL EXCURSION

Onset time of arrival after time break $T_o$ is $T_B$, which is the time from the instant of detonation $T_o$ shown on FIG. 6 until the instant B that the sound of detonation at point B, FIG. 5 occurs on the vertical straight explosive material 11b, which = $D\,B/Vpc$ = 70'/22,000 = 0.003 seconds. Duration 13b = $T_{DB} - (D\,B/Vpc) = (D\,B/Vw)$ = (70'/5,000) − (70'/22,000) = 0.011 seconds.

GHOST PULSE OR RAREFRACTIONAL EXCURSION

Onset time D' of ghost pulse, measured from $T_o$ is $T_{D'}$ which is the time from the instant of detonation $T_o$ shown on FIG. 6 until the instant D' that the sound of detonation at point 12b, FIG. 5, travels through the water up to the surface and back down to arrive at point B, FIG. 5, on the vertical straight explosive material 11b, which = $(D\,A + 2\,A\,C + A\,B/Vw)$ = (410'/5,000) = 0.082 seconds. Duration 15c = $T_{D'B} = (D\,B/Vw) + (D\,B/Vpc)$ = (70'/5,000) + (70'/22,000) = 0.017 seconds. Pulses from generator portion D A:

PRIMARY PULSE COMPRESSIONAL EXCURSION

Onset time of arrival after time break $T_o$ is $T_D$, which is the time from the instant of detonation $T_o$ shown on FIG. 6 until the instant D that the sound of detonation at point D, FIG. 5, arrives through the water at point B, FIG. 5, on the vertical straight explosive material 11b, which = $(D\,B/Vw)$ = (70'/5,000) = 0.014 seconds. Duration 13c = $T_{DA} = (D\,A/Vw) + (D\,A/Vpc)$ = (150'/5,000) + (150'/22,000) = 0.037 seconds.

GHOST PULSE OR RAREFACTIONAL EXCURSION

Onset time A' of ghost pulse measured $T_o$ is $T_A{}^{40}$, which is the time from the instant of detonation $T_o$ shown on FIG. 6 until the instant A' that the sound of detonation at point A, FIG. 5, travels through the water up to the surface and back down to arrive at bottom point B, which = $(D\,A/Vpc) + 2\,A\,C + A\,B/Vw$ = 150'/22,000 + 260'/5,000 = 0.059 seconds. Duration 15b = $T_{A'D} = D\,A/Vw - D\,A/Vpc$ = 150'/5,000 − 150'/22,000 = 0.023 seconds. Onset time D' of ghost pulse measured $T_o$ is $T_{D'}$ which is the time from the instant D' that the sound of detonation at point 12b, FIG. 5, travels through the water up to the surface and back down to arrive at bottom point B, which = $(D\,A + 2\,A\,C + A\,B/Vw)$ = (150' + 40' + 220'/5,000) = 0.082 seconds.

Accordingly, it is seen that the third embodiment 11b of the invention generates and shapes a seismic energy pulse that may vary in length and shape in the complete range from the embodiment 11 of FIGS. 1 and 2 to the embodiment 11a of FIGS. 3 and 4 as extreme limits.

The shape of the seismic energy pulse may be varied further likewise by varying the length A B of the vertical straight explosive material, by varying the depth A C of the explosive material below the surface of the seismic energy propagation medium, and by varying the position of the detonator 12b on the linear explosive material.

Accordingly, it will be seen that the disclosed methods which are new uses for known seismic energy pulse generators are methods which attenuate secondary bubble pulses and operate in a manner which meets each of the objects set forth hereinbefore by reducing the magnitude of the secondary bubble pulses and oscillations by generating elongated bubbles.

While a few methods of the invention and a few mechanisms for carrying out the methods have been disclosed, it will be evident that various other methods and modifications are possible in the arrangement and construction of the disclosed methods and apparatuses for generating and shaping a seismic energy pulse for attenuation of secondary oscillation without departing from the scope of the invention and it is accordingly desired to comprehend within the purview of this invention such modifications and methods as may be considered to fall within the scope of the appended claims.

I claim:

1. A new use for a known seismic generator for generating a particular shaped single seismic energy pulse for delineation of sedimentary section below the surface of a body of water comprising,
   a. forming a vertical straight explosive material of a predetermined length,
   b. positioning the vertical straight explosive material at a predetermined substantial depth below the surface of the water,
   c. generating a single compressional first portion of said seismic energy pulse of a predetermined precise length downwardly to the lower end of the vertical straight explosive material, and
   d. generating a single rarefactional aft portion of said seismic energy pulse of a second predetermined precise length first upwardly to the surface and then downwardly to the position of the lower end of the vertical straight explosive material,
   variation in the length of the vertical straight integral explosive material and variation in the depth of the vertical straight integral explosive material provides variation in both of said seismic energy pulse signal compressional forward portion and said seismic energy pulse signal rarefactional aft portion to predetermine the shaping of the single seismic energy pulse.

2. A new use for a seismic energy generator as recited in claim 1 comprising,
   a. generating a predetermined shaped seismic energy pulse by downward burning of the vertical straight integral homogeneous explosive material having the predetermined length, and b. generating both said compressional forward portion and said rarefactional aft portion of said seismic energy pulse of predetermined precise lengths.

3. A new use for a seismic energy generator as recited in claim 1 wherein, a. generating a predetermined shaped seismic energy pulse by upward burning of the vertical straight integral homogeneous explosive material having the predetermined length, and b. generating both said compressional forward portion and said rarefactional aft portion of said seismic energy pulse of predetermined precise lengths.

4. A new use for a seismic energy generator as recited in claim 1 wherein, a. generating a predetermined shaped seismic energy pulse by burning of the vertical straight integral homogeneous explosive material having the predetermined length in both directions simultaneously, and b. generating both said compressional forward portion and said rarefactional aft portion of said seismic energy pulse of predetermined precise lengths.

5. A new use for a known energy pulse generator for delineation of sedimentary section below the surface of a seismic energy propagation medium comprising the method steps of, a. suspending at a substantial predetermined depth below the surface, a vertical straight integral homogenous explosive material means of a predetermined length having a constant uniform velocity of detonation for the full length thereof substantially greater than the velocity of propagation in the immediate surrounding seismic energy propagation medium, b. positioning a detonator on the vertical straight integral explosive material means having the predetermined length, c. producing a first energy pulse downwardly in the immediate surrounding energy propagation medium to form a compressional first position of a seismic energy pulse at the lower end of the vertical straight integral explosive material means having the predetermined length by the vertical straight integral explosive material being responsive to the detonator, and d. producing a second energy pulse through a longer path of first upwardly to the surface and then downwardly in the immediate surrounding energy propagation medium arriving later at the lower end to form a rarefactional aft portion of the seismic energy pulse by the vertical straight integral explosive material means having the predetermined length being responsive to the detonator, variation in the position of the detonator along the length of the vertical straight integral explosive material means provides variation in both of the seismic energy pulse compressional forward portion and the seismic energy pulse rarefactional aft portion to predetermine shaping of the seismic energy pulse.

6. A new use for a known seismic energy generator for forming and shaping a seismic energy pulse under the surface of a seismic energy propagation medium comprising, a. forming a vertical straight explosive material of a predetermined length, b. positioning the vertical straight explosive material at a predetermined substantial depth below the surface of the water, c. forming a compressional forward portion of the seismic energy pulse downwardly to one point in the seismic energy propagation medium at the substantial predetermined depth, and d. forming a rarefactional aft portion of the seismic energy pulse first upwardly to the surface and then downwardly to the one point, variation in the length of the vertical straight explosive material providing variation in both the seismic energy pulse compressional forward portion and the seismic energy pulse rarefactional aft portion to predetermine the shaping of the seismic energy pulse.

* * * * *